(12) United States Patent
Minami et al.

(10) Patent No.: US 6,744,444 B2
(45) Date of Patent: Jun. 1, 2004

(54) CIRCUIT FOR DETECTING VALID RANGE OF VIDEO SIGNAL

(75) Inventors: Kouji Minami, Tokyo (JP); Yoshito Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 295 days.

(21) Appl. No.: 09/781,451

(22) Filed: Feb. 13, 2001

(65) Prior Publication Data

US 2002/0047922 A1 Apr. 25, 2002

(30) Foreign Application Priority Data

Oct. 25, 2000 (JP) ........................................ 2000-325236

(51) Int. Cl.[7] .............................. G09G 5/02; G09G 5/00
(52) U.S. Cl. ......................... 345/699; 345/204; 345/213
(58) Field of Search ............................ 345/1.1, 3.1–3.4, 345/98–100, 212, 213, 698, 699, 204; 348/441, 445, 500, 511, 512, 739, 745, 747

(56) References Cited

U.S. PATENT DOCUMENTS

| | | | |
|---|---|---|---|
| 5,592,187 A | * | 1/1997 | Zenda ......................... 345/3.2 |
| 5,909,205 A | * | 6/1999 | Furuhashi et al. ............. 345/98 |
| 5,987,624 A | * | 11/1999 | Eglit ............................ 714/32 |
| 6,043,803 A | * | 3/2000 | Shimizu ...................... 345/581 |
| 6,377,251 B1 | * | 4/2002 | Takasu et al. ............... 345/204 |
| 6,483,502 B2 | * | 11/2002 | Fujiwara ..................... 345/213 |

FOREIGN PATENT DOCUMENTS

| JP | 6-266311 | 9/1994 | ............ G09G/3/36 |
|---|---|---|---|
| JP | 10-91127 | 4/1998 | ............ G09G/3/36 |

* cited by examiner

Primary Examiner—Alexander Eisen
(74) Attorney, Agent, or Firm—Birch, Stewart, Kolasch & Birch, LLP (57) ABSTRACT

A circuit for detecting a valid range of a video signal, has a detection window signal generator for generating a detection region window signal which has a low level during at range of time containing a point of time when the vertical sync signal changes its level or another point of time when the horizontal sync signal changes its level, and a valid range detector for detecting the valid range, during which the video signal has a level equal to or greater than a threshold and the detection region window signal has a high level.

10 Claims, 12 Drawing Sheets

FIG.1

FIG.3A HORIZONTAL SYNC SIGNAL H₁

FIG.3B SIGNAL A₁

FIG.3C VIDEO SIGNAL S₁

FIG.4A SIGNAL A₁

FIG.4B SIGNAL B₁

FIG.4C DETECTION REGION WINDOW SIGNAL D₁

FIG.5

| (5, 4) | (6, 4) | (7, 4) | (8, 4) | (9, 4) | (10,4) | (11,4) | (12,4) |
|---|---|---|---|---|---|---|---|
| (5, 5) | (6, 5) | (7, 5) | (8, 5) | (9, 5) | (10,5) | (11,5) | (12,5) |
| (5, 6) | (6, 6) | (7, 6) | (8, 6) | (9, 6) | (10,6) | (11,6) | (12,6) |
| (5, 7) | (6, 7) | (7, 7) | (8, 7) | (9, 7) | (10,7) | (11,7) | (12,7) |

CONVENTIONAL ART

| (1, 4) | (2, 4) | (3, 4) | (4, 4) | (5, 4) | (6, 4) | (7, 4) | (8, 4) |
|--------|--------|--------|--------|--------|--------|--------|--------|
| (1, 5) | (2, 5) | (3, 5) | (4, 5) | (5, 5) | (6, 5) | (7, 5) | (8, 5) |
| (1, 6) | (2, 6) | (3, 6) | (4, 6) | (5, 6) | (6, 6) | (7, 6) | (8, 6) |
| (1, 7) | (2, 7) | (3, 7) | (4, 7) | (5, 7) | (6, 7) | (7, 7) | (8, 7) |

CIRCUIT FOR DETECTING VALID RANGE OF VIDEO SIGNAL

BACKGROUND OF THE INVENTION

The present invention relates to a circuit for detecting a valid range of a video signal, which may be used in a display apparatus of a personal computer (PC) and the like.

Video signals utilized in PCs have signal formats of various numbers of scan lines, picture elements and frame frequencies. Further, a video signal has a valid range (a range of time during which the video signal is displayed on a display screen), which is located at various positions within the video signal. Accordingly, for purpose of providing an image display, it is required that a location that an input signal should occupy on a display screen be adjusted in accordance with the signal format of the input signal. Measures are taken to allow the valid range of the video signal to be detected automatically so that a portion of the video signal that is contained within the valid range may be displayed on a display screen at an appropriate position.

Figure 11:
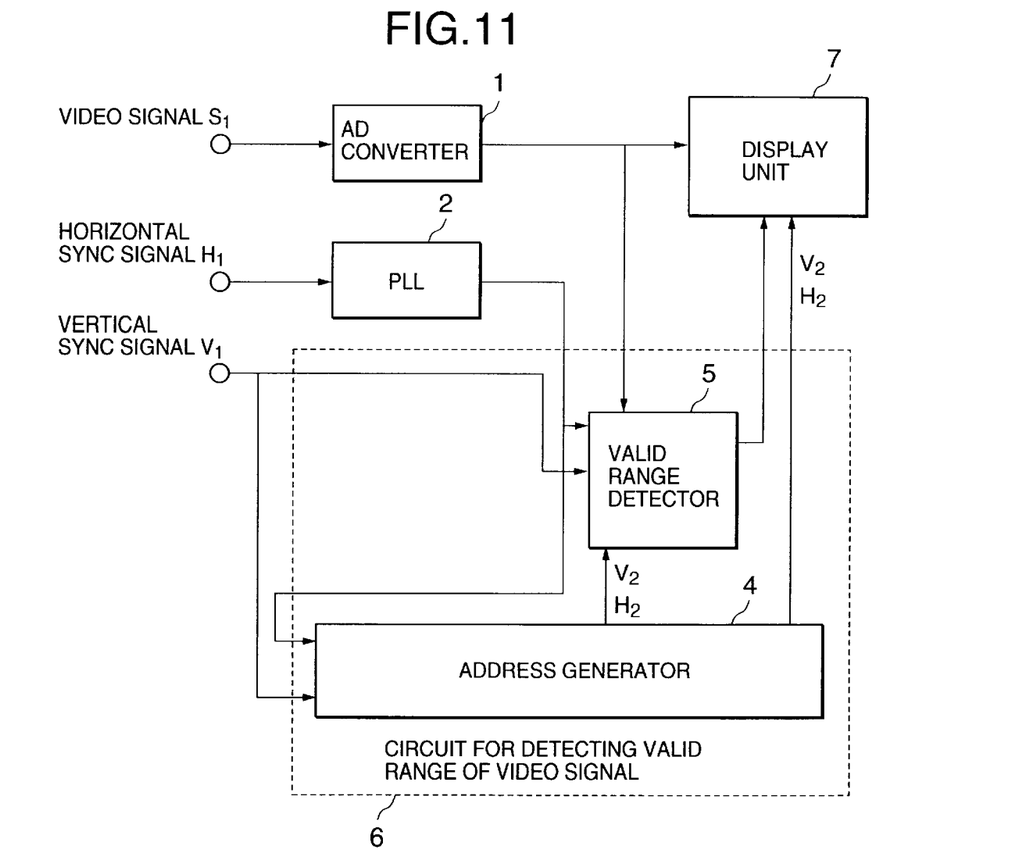
FIG. 11 is a block diagram showing a display apparatus incorporating a conventional circuit for detecting a valid range of a video signal.

FIG. 11 is a block diagram showing a display apparatus using a conventional circuit for detecting a valid range of a video signal. In FIG. 11, a reference numeral 1 denotes an A/D converter which converts a video signal into a digital signal, and 2 denotes a PLL circuit which generates from a horizontal sync signal $H_1$ a dot clock and a horizontal reference signal, both of which are used in an internal processing. Further, a reference numeral 4 denotes an address generator which generates a horizontal address signal $H_2$ and a vertical address signal $V_2$ on the basis of the horizontal reference signal and a vertical sync signal $V_1$, and 5 denotes a valid range detector which detects a valid range of a video signal. The address generator 4 and the valid range detector 5 form together a circuit 6 for detecting a valid range of a video signal. In FIG. 11, a reference numeral 7 denotes a display unit, which has a display screen and displays the video signal on the display screen in accordance with a horizontal address signal $H_2$, a vertical address signal $V_2$ and an output signal from the valid range detector 5. For ease of description, it is assumed in the description to follow that the display screen of the display unit 7 is a matrix display device having eight horizontal rows and four vertical columns or a total of 32 (=8×4) picture elements. The display screen may be any one of a liquid crystal panel, a PDP (plasma display panel) a DMD (digital micro-mirror device) and the like.

Figure 12:
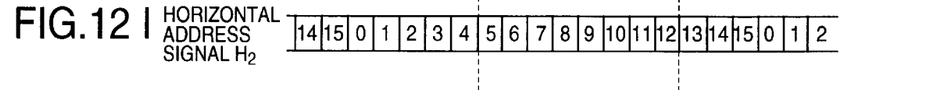
Figure 12A:
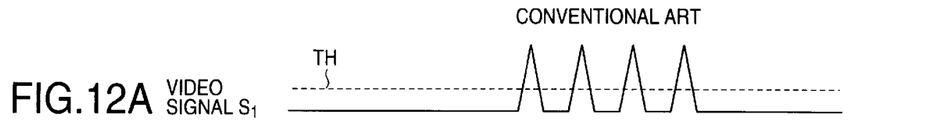
Figure 12B:
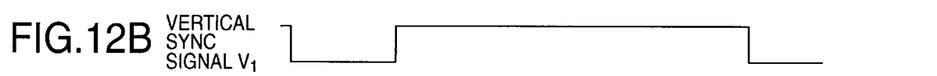
Figure 12C:
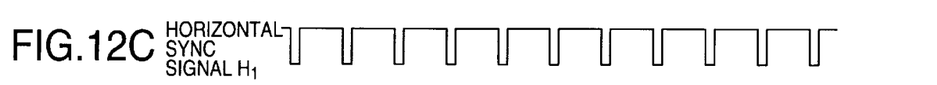
Figure 12D:
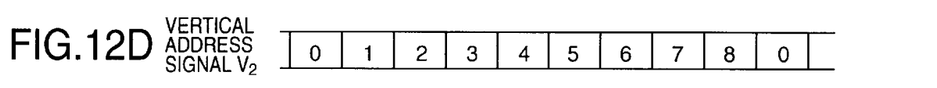
Figure 12E:
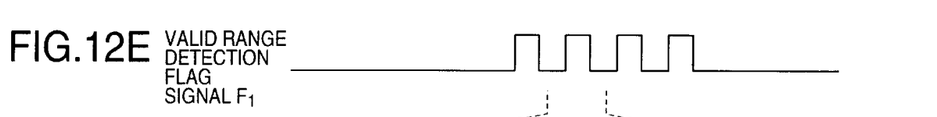
Figure 12F:
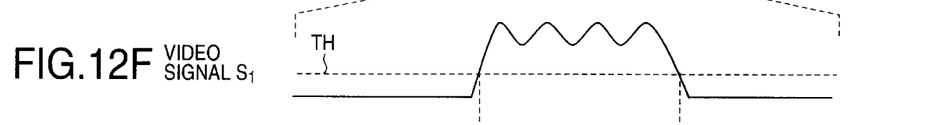
Figure 12G:
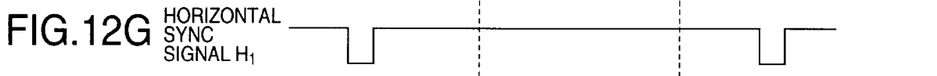
Figure 12H:
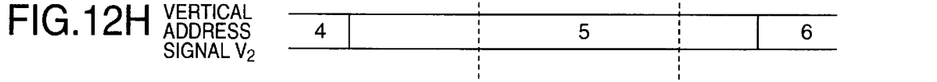
Figure 12J:
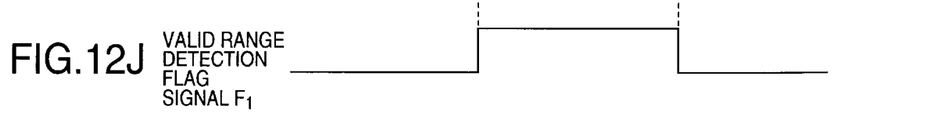

The operation of the conventional circuit shown in FIG. 11 will be described below with reference to a series of timing charts shown in FIGS. 12A to 12J. FIGS. 12A and 12F show a video signal $S_1$ which is input, FIG. 12B shows a vertical sync signal $V_1$ which is input, FIGS. 12C and 12G show a horizontal sync signal $H_1$ which is input, FIGS. 12D and 12H show a vertical address signal $V_2$ which is output from the address generator 4, FIGS. 12E and 12J show a valid range detection flag signal $F_1$ which is used in the internal processing performed by the valid range detector 5, and FIG. 12I shows a horizontal address signal $H_2$. FIGS. 12F to 12J show part of FIGS. 12A to 12E in enlarged scale in time. In the description to follow, it is assumed that the horizontal sync signal $H_1$ and the vertical sync signal $V_1$ which are input are negative-polarity pulses, as shown in FIGS. 12B and 12C, respectively, having a falling edge as a Leading edge and a rising edge as a trailing edge.

The video signal $S_1$ shown in FIGS. 12A and 12F is input to the A/D converter 1. The A/D converter 1 then converts it into a digital signal, which is sent to the valid range detector 5 and the display unit 7.

The PLL circuit 2 produces a dot clock. The PLL circuit 2 produces a horizontal reference signal by frequency-dividing the dot clock, and controls the dot clock frequency so that the falling edge of the horizontal reference signal coincides with the falling edge of the horizontal sync signal $H_1$ shown in FIGS. 12C and 12G. The horizontal sync signal $H_1$ and the horizontal reference signal are generally substantially aligned in their falling edges, but the horizontal reference signal that is in complete synchronization with the dot clock is used in the internal processing.

The address generator 4 generates the vertical address signal $V_2$ by means of a counter which is reset by the falling edge of the vertical sync signal $V_1$ and which is incremented by one by the falling edge of the horizontal reference signal (which coincides with the falling edge of the horizontal sync signal $H_1$), in a manner shown in FIG. 12D. Simultaneously, the address generator 4 generates the horizontal address signal $H_2$ by means of a counter which is reset by the falling edge of the horizontal reference signal and which is incremented by one by the dot clock, in a manner shown in FIG. 12I. The horizontal address signal $H_2$ and the vertical address signal $V_2$ are used by the valid range detector 5 and the display unit 7 as address information which indicates horizontal and vertical positions on the display screen.

The valid range detector 5 produces a valid range detection flag signal $F_1$ (see FIGS. 12E and 12J), which has a high level when the video signal $S_1$ is equal to or greater than a threshold TH and has a low level otherwise, on the basis of the comparison of the video signal $S_1$ shown in a solid line and a predetermined threshold TH shown in a broken line in FIGS. 12A and 12F. The threshold TH is chosen to be equal to about one-eighth of a maximum amplitude of the video signal $S_1$. The valid range detector 5 outputs a minimum value (or "5" shown in FIG. 12I) and a maximum value (or "12" shown in FIG. 12I) of the horizontal address signal $H_2$ during the range of time the flag signal $F_1$ has the high level to the display unit 7 as a left-end coordinate and a right-end coordinate, respectively. It also outputs a minimum value (or "4" in FIG. 12D) and a maximum value (or "7" in FIG. 12D) of the vertical address signal $V_2$ during the range of time the flag signal $F_1$ has the high level to the display unit 7 as an upper-end coordinate and a lower-end coordinate, respectively.

The display unit 7 displays the video signal $S_1$ on the display screen at an appropriate position in accordance with left-end, right-end, upper-end and lower-end coordinates as input from the valid range detector 5, and the horizontal address signal $H_2$ and the vertical address signal $V_2$ which are input from the address generator 4. In the following description, values H and V of the horizontal address signal $H_2$ and the vertical address signal $V_2$ are denoted by (H,V) for purpose of convenience, wherein both H and V are positive integers.

Figure 13:
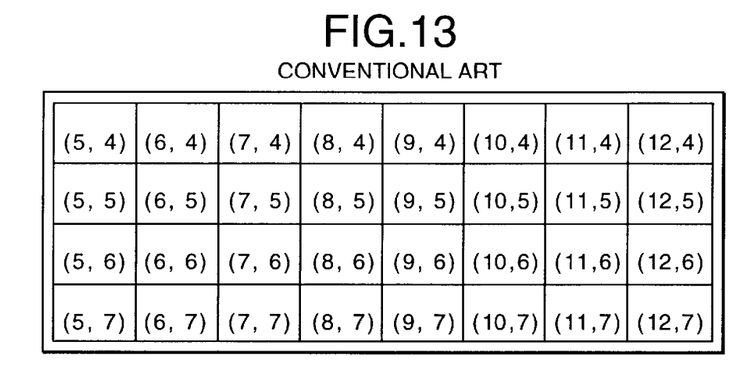
FIG. 13 is a diagram indicating a display given on the display screen of the display unit shown in FIG. 11.

By way of example, if the left-end coordinate is "5", the right-end coordinate is "12", the upper-end coordinate is "4" and the lower-end coordinate is "7", the video signal which is input at a timing of (5,4) for the horizontal address signal $H_2$ and the vertical address signal $V_2$ is displayed on an upper-left picture element. The video signal which is input at a timing of (6,4) for the horizontal address signal $H_2$ and the vertical address signal $V_2$ will be displayed on a picture element which is located immediately to the right of the picture element, on which the video signal input at the timing of (5,4) has been displayed. A relationship between the position on the display screen and the values of the horizontal address signal $H_2$ and the vertical address signal $V_2$ is diagrammatically shown in FIG. 13.

In the above-described operation of the valid range detector 5, it is assumed that there is a video signal equal to or greater than the threshold at the left-end, right-end, upper-end and lower-end which collectively define the valid range, but this presents no problem for practical purposes inasmuch as a video signal is existing to the ends of the valid range of the video signal where an operating system having graphics user interface, which represents the main stream of recent versions of PCs, is used.

What has been described above is the arrangement of the conventional circuit for detecting a valid range of a video signal, and such arrangement suffers from the difficulty of properly detecting the valid range under the influence of a crosstalk noise which becomes mixed with the video signal on a cable which conveys the video signal.

An exemplary operation of the conventional circuit when a crosstalk noise CN from the horizontal sync signal $H_1$ is mixed with the video signal will be described with reference to FIGS. 14A–14E.

Figures 14A, 14B:
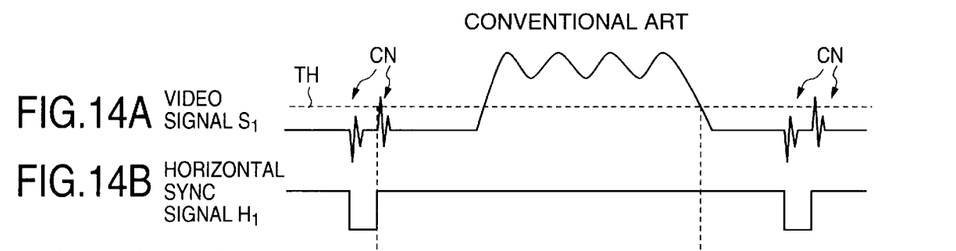
Figure 14C:
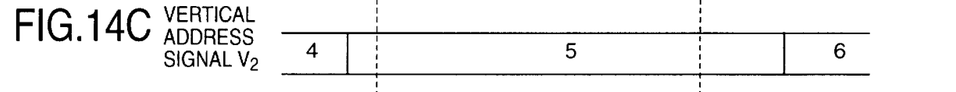
Figure 14D:
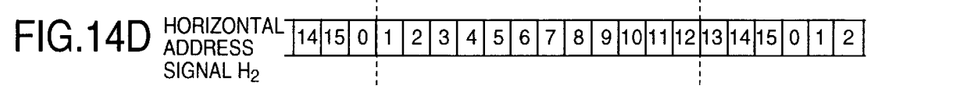
Figure 14E:
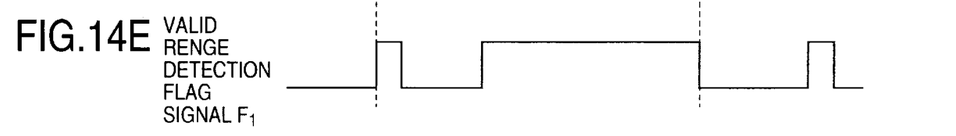
Figure 15:
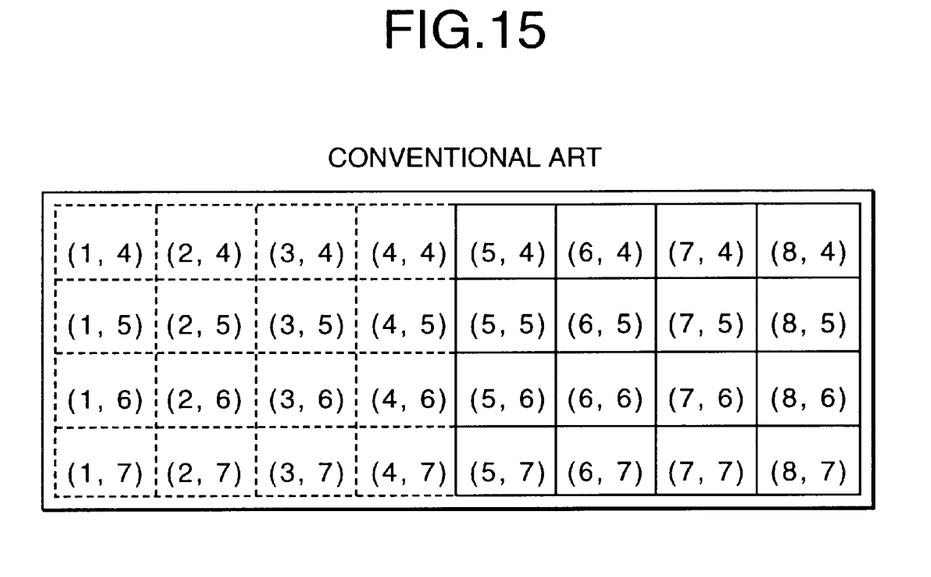
FIG. 15 is a diagram indicating a display given on the display screen of the display unit shown in FIG. 11.

FIG. 14A shows a behavior of the video signal $S_1$ when a crosstalk noise CN from the horizontal sync signal $H_1$ is mixed therewith. It is seen that a ringing noise occurs in response to a change in the horizontal sync signal $H_1$. When such video signal $S_1$ is input to the valid range detector 5, a portion of the crosstalk noise CN which exceeds the threshold TH will be detected as representing the valid range, and accordingly, the flag signal $F_1$ which indicates the detection of the valid range behaves in a manner shown in FIG. 14E. Hence, the minimum value of the horizontal address signal $H_2$ during the time the flag signal $F_1$ has the high level occurs as "1", as indicated in FIG. 14D, which is as much as four picture elements displaced to the left of the correct value of "5" for the left-end coordinate. Accordingly, because the display unit 7 displays the picture element at the wrong left-end coordinate at the leftmost position, thereby resulting a display as illustrated in FIG. 15. In FIG. 15, picture elements, which are located in the leftmost four columns that are delineated by broken lines, represent a picture during the non-valid range of time.

It will be seen from the foregoing that the conventional circuit as described above fails to detect a valid range correctly to cause an offset in the display position on the display screen where a crosstalk noise CN exists as on a cable, through which the video signal $S_1$ is transmitted, by superimposing a change in the sync signal upon the video signal.

SUMMARY OF THE INVENTION

It is an object of the present invention to provide a circuit for detecting a valid range of a video signal capable of correctly detecting a valid range of a video signal in the presence of a crosstalk noise which may result from the superimposition of a change in the sync signal upon a video signal on a cable.

According to the present invention, a circuit detects a valid range of a video signal on the basis of a vertical sync signal which has a first period and has a first level only during a first range of time and a second level otherwise, a horizontal sync signal which has a second period and has a third level only during a second range of time and a fourth level otherwise, and the video signal, the valid range being a range of time of the video signal which is to be displayed on a display screen. The circuit comprises a detection window signal generator for generating a detection region window signal which has a fifth level during at least one of a first detection disable range of time of a predetermined length and a second detection disable range of time of a predetermined length, and has a sixth level otherwise, the first detection disable range of time containing a point of time when the vertical sync signal changes its level, the second detection disable range of time containing a point of time when the horizontal sync signal changes its level; and a valid range detector for detecting the valid range, during which the video signal has a level equal to or greater than a predetermined threshold and the detection region window signal has the sixth level.

According to another aspect of the present invention, a circuit detects a valid range of a video signal on the basis of a vertical sync signal which has a first period and has a first level only during a first range of time and a second level otherwise, a horizontal sync signal which has a second period and has a third level only during a second range of time and a fourth level otherwise, and the video signal, the valid range being a range of time of the video signal which is to be displayed on a display screen. The circuit comprises: a detection window signal generator for generating a detection region window signal which has a fifth level during at least one of a first detection disable range of time of a predetermined length and a second detection disable range of time of a predetermined length, and has a sixth level otherwise, the first detection disable range containing a point of time when the vertical sync signal changes its level, the second detection disable range of time containing a point of time when the horizontal sync signal changes its level; a gate for allowing the video signal to pass therethrough when the detection region window signal has the sixth level and for outputting a zero-level signal as the video signal when the detection region window signal has the fifth level; and a valid range detector for detecting the valid range, during which an output of the gate has a level equal to or greater than a predetermined threshold.

BRIEF DESCRIPTION OF THE DRAWINGS

The present invention will become more fully understood from the detailed description predetermined hereinbelow and the accompanying drawings which are predetermined by way of illustration only, and thus are not limitative of the present invention, and wherein:

FIGS. 2A to 2L are a series of timing charts for illustrating the operation of various parts of the circuit shown in FIG. 1;

FIGS. 3A to 3C are a series of timing charts illustrating the operation of a detection region window signal generator shown in FIG. 1;

FIGS. 4A to 4C are a series of timing charts for illustrating the operation of the detection region window signal generator shown in FIG. 1;

FIGS. 7A to 7F are a series of timing charts for illustrating the operation of various parts of the circuit shown in FIG. 6;

FIGS. 8A to 8F are a series of timing charts for illustrating the operation of various parts of a circuit according to a third embodiment of the present invention;

FIGS. 10A to 10C are a series of timing charts for illustrating the operation of a gate circuit shown in FIG. 9;

FIGS. 12A to 12J are a series of timing charts for illustrating the operation of various parts of the conventional circuit;

FIGS. 14A to 14E are a series of timing charts for illustrating the operation of various parts of the conventional circuit.

DETAILED DESCRIPTION OF THE INVENTION

Further scope of applicability of the present invention will become apparent from the detailed description predetermined hereinafter. However, it should be understood that the detailed description and specific examples, while indicating preferred embodiments of the invention, are predetermined by way of illustration only, since various changes and modifications will become apparent to those skilled in the art from the detailed description.

First Embodiment

Figure 1:
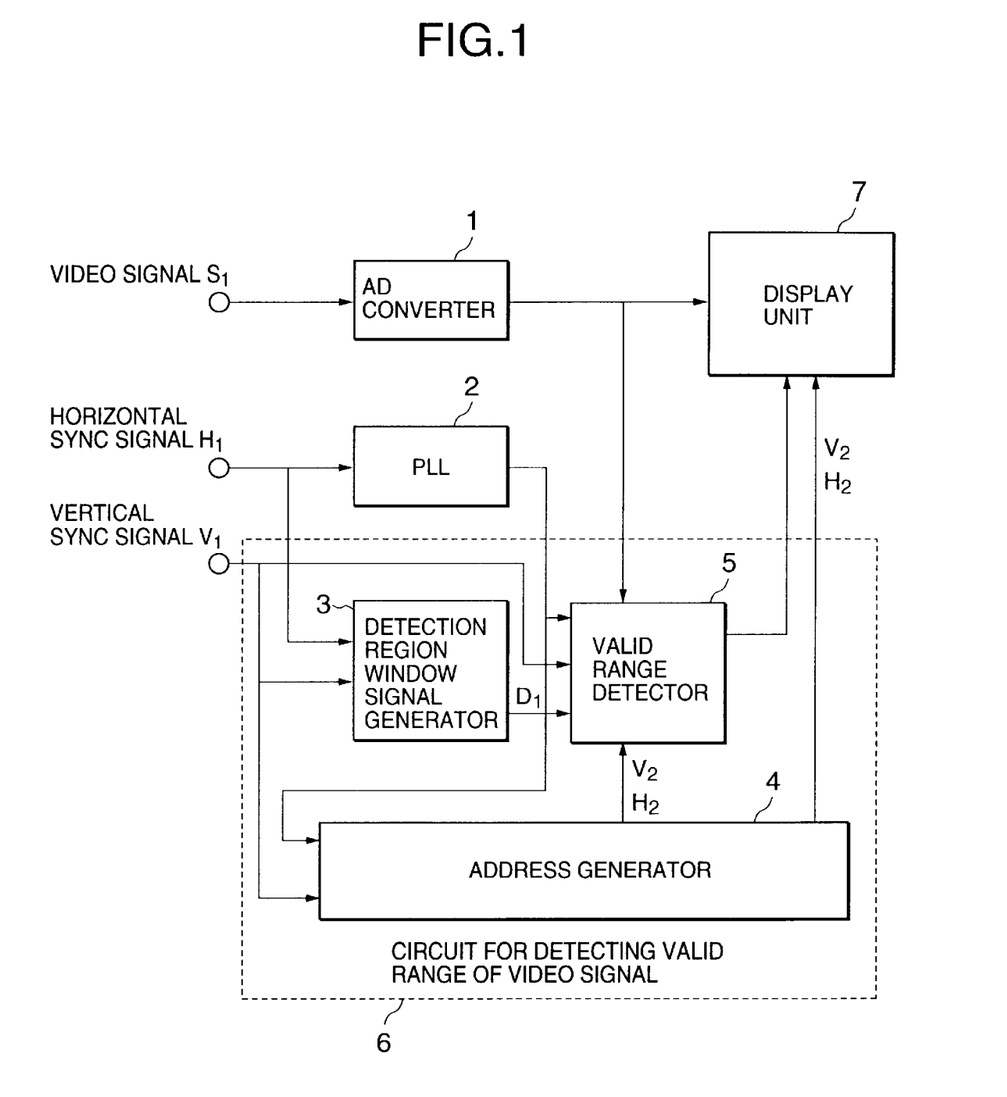
FIG. 1 is a block diagram showing a display apparatus incorporating a circuit for detecting a valid range of a video signal according to a first embodiment of the present invention.

FIG. 1 is a block diagram showing a display apparatus incorporating a circuit for detecting a valid range of a video signal according to a first embodiment of the present invention. In FIG. 1, a reference numeral 1 denotes an A/D converter which converts a video signal $S_1$ into a digital signal, and 2 denotes a PLL circuit which generates from a horizontal sync signal $H_1$ a dot clock and a horizontal reference signal, both of which are used in internal processing. Further, a reference numeral 3 denotes a detection region window signal generator for generating a detection region window signal $D_1$, which is a control signal inhibiting the detection at a predetermined timing when detecting a valid range of the video signal $S_1$, 4 denotes an address generator which generates a horizontal address signal $H_2$ and a vertical address signal $V_2$ on the basis of the horizontal reference signal and a vertical sync signal $V_1$, and 5 denotes a valid range detector which detects the valid range of a video signal. The detection region window signal generator 3, the address generator 4 and the valid range detector 5 form in combination the circuit 6 for detecting a valid range of a video signal. In FIG. 1, a reference numeral 7 denotes a display unit including a display screen such as a liquid crystal panel, a PDP or the like. The display unit 7 displays the video signal $S_1$ on a display screen on the basis of the horizontal address signal $H_2$, the vertical address signal $V_2$ and output signals from the valid range detector 5. For ease of description, it is assumed in the description to follow that the display screen in the display unit 7 is a matrix display device having eight horizontal rows and four vertical columns or a total of 32 (=8×4) picture elements.

Figure 2A:
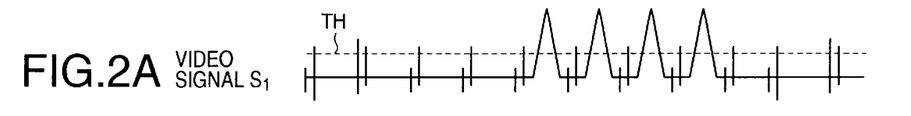
Figure 2B:
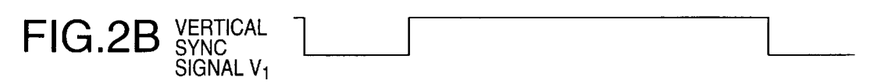
Figure 2C:
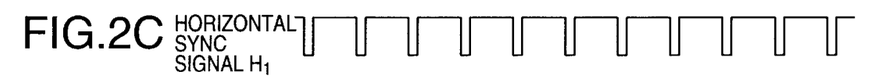

The operation of the display apparatus shown in FIG. 1 will be described below with reference to a series of timing charts shown in FIGS. 2A to 2L, which indicate the timings of various parts of the display apparatus incorporating the circuit 6 for detecting a valid range of a video signal according to the first embodiment. FIGS. 2A and 2G show a video signal $S_1$ which is input, FIG. 2B a vertical sync signal $V_1$ which is input, FIGS. 2C and 2H a horizontal sync signal $H_1$ which is input, FIGS. 2D and 2I a vertical address signal $V_2$ which is output from the address generator 4, FIGS. 2E and 2K a detection region window signal $D_1$, FIGS. 2F and 2L a valid range detection flag signal $F_1$ which is used in the internal processing by the valid range detector 5, and FIG. 2J a horizontal address signal $H_2$. FIGS. 2G to 2L show part of FIGS. 2A to 2F in enlarged scale in time. In the description to follow, it is assumed that the horizontal sync signal $H_1$ and the vertical sync signal $V_1$ which are input are negative-polarity pulses, having a falling edge as a leading edge and a rising edge as a trailing edge.

The video signal $S_1$ as shown in FIGS. 2A and 2G is input to the A/D converter 1, which converts it into a digital signal, which is sent to the valid range detector 5 and the display unit 7.

The PLL circuit 2 produces a dot clock. The PLL circuit 2 produces a horizontal reference signal by frequency-dividing the dot clock, and controls the dot clock frequency so that the falling edge of the horizontal reference signal coincides with the falling edge of the horizontal sync signal $H_1$ which is input.

Figure 2D:
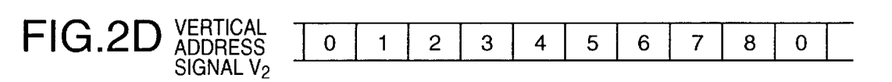
Figure 2E:
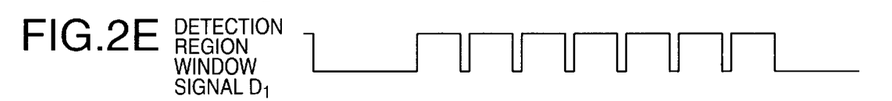
Figure 2F:
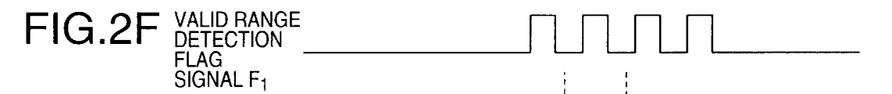
Figures 2G, 2H:
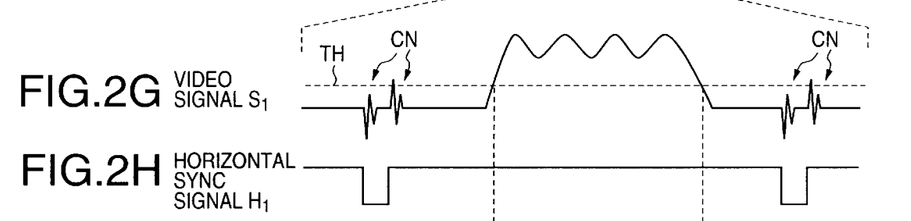
Figure 2I:
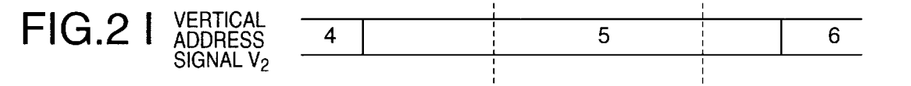
Figure 2J:
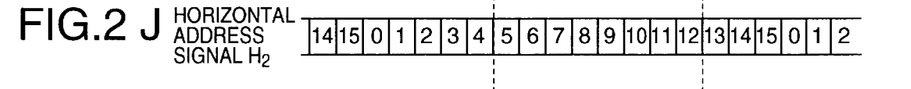
Figure 2K:
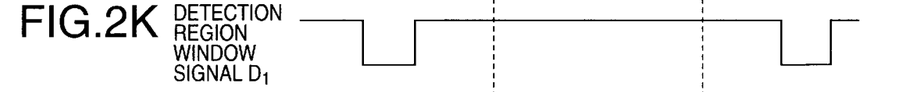
Figure 2L:
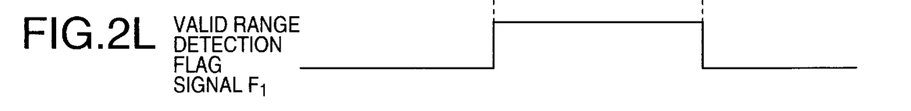

The address generator 4 generates the vertical address signal $V_2$ by means of a counter which is reset by the falling edge of the vertical sync signal $V_1$ and which is incremented by one by the falling edge of the horizontal reference signal (which coincides with the falling edge of the horizontal sync signal $H_1$), in a manner shown in FIG. 2D. Further, the address generator 4 generates the horizontal address signal $H_2$ by means of a counter which is reset by the falling edge of the horizontal reference signal and which is incremented by one by the dot clock, in a manner shown in FIG. 2J. The horizontal address signal $H_2$ and the vertical address signal $V_2$ are used by the valid range detector 5 and the display unit 7 as address information collectively which indicates horizontal and vertical positions on the display screen.

Figure 3A:
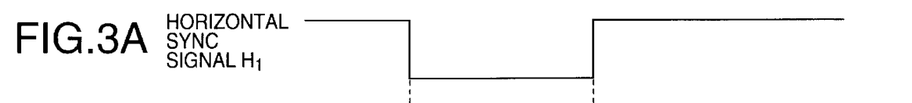
Figure 3B:
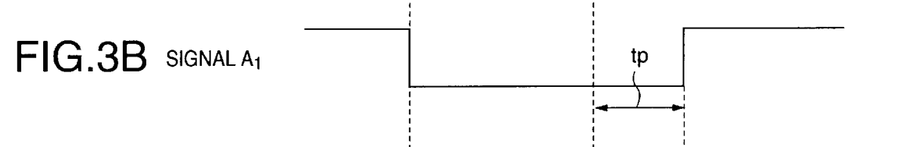
Figure 3C:
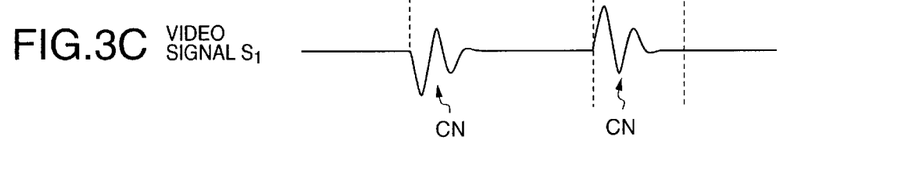

The detection region window signal generator 3 generates a signal $A_1$ which is caused to be at a low level in response to the falling edge of the horizontal reference signal and is caused to be at a high level with a predetermined time delay tp in response to the rising edge thereof, as shown in FIGS. 3A to 3C. The time delay tp is chosen to allow a noise, which is superimposed upon the video signal in the presence of crosstalk from the rising edge of the horizontal sync signal $H_1$, to be attenuated to a negligibly small value. The length of the time delay tp depends on the magnitude of the crosstalk noise CN, and thus is determined for a worst case in consideration of the circuit arrangement of the display apparatus. Alternatively, the time delay tp may be determined by experiments.

Figure 4A:
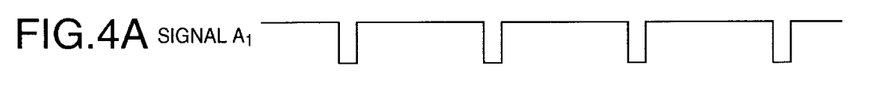
Figure 4B:
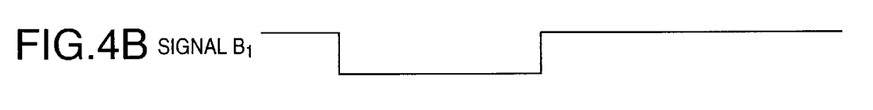
Figure 4C:
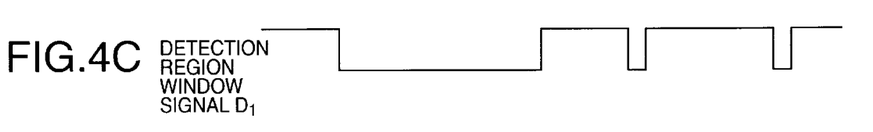

The detection region window signal generator 3 produces a signal $B_1$ which is caused to be at a low level in response to the falling edge of the vertical sync signal $V_1$ and is caused to be at a high level with a predetermined time delay of tp in response to the rising edge of the vertical sync signal V, in a manner shown in FIGS. 4A to 4C, and a logical product of the signals $A_1$ and $B_1$ defines the detection region window signal $D_1$.

The valid range detector 5 compares the video signal $S_1$, which is shown in a solid line in FIG. 2A or 2G, against a predetermined threshold TH, which is shown in a broken line in FIG. 2A or 2G. The valid range detector 5 produces a valid range detection flag signal $F_1$ (see FIGS. 2F and 2L) which has a high level when the detection region window signal $D_1$ has a high level, and has a low level otherwise. The predetermined threshold TH is chosen to be equal to about one-eighth of a maximum amplitude of the video signal $S_1$. By using the video region window signal in the detection of the valid range, the influence of a crosstalk noise CN which may arise from the horizontal sync signal $H_1$ or the vertical sync signal $V_1$ and may become mixed with the video signal $S_1$ can be eliminated. The valid range detector 5 outputs signals to the display unit 7, having values representing the left-end and right-end coordinates and corresponding to the minimum value and the maximum value in the horizontal address signal $H_2$ during the time the flag signal $F_1$ has its high level. The valid range detector 5 also outputs signals to the display unit 7, having values representing the upper-end and the lower-end coordinates and corresponding to the minimum value and the maximum value in the vertical address signal $V_2$ during the time the flag signal $F_1$ has its high level.

Figure 5:
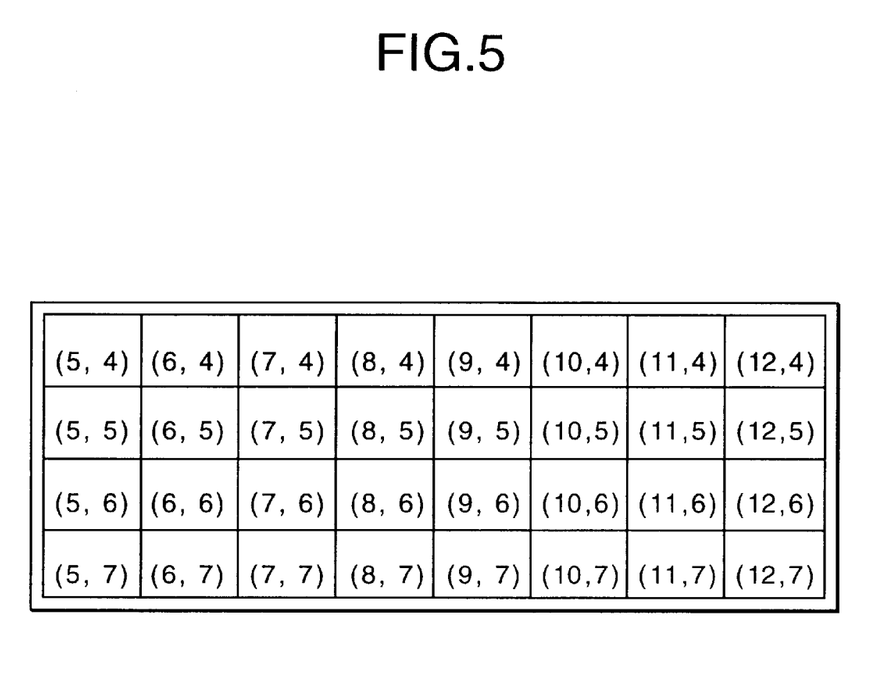
FIG. 5 is a diagram showing a display given on the display screen of the display unit shown in FIG. 1.

The display unit 7 displays the video signal on the display screen at an appropriate position in accordance with left-end, right-end, upper-end and lower-end coordinates as input from the valid range detector 5 and the horizontal address signal $H_2$ and vertical address signal $V_2$ which are input from the address generator 4. By way of example, if the left-end coordinate is "5", the right-end coordinate is "12", the upper-end coordinate is "4" and the lower-end coordinate is "7", a video signal which is input at a timing of (5,4) for the horizontal address and the vertical address will be displayed on an upper-left picture element, and a video signal which is input at a timing of (6,4) for the horizontal address and vertical address will be displayed on the picture element which is located immediately to the right thereof. A relationship between the position on the display screen and the horizontal and vertical addresses is shown in FIG. 5.

As discussed above, when the circuit 6 for detecting a valid range of a video signal according to the first embodiment is used, an influence from noise components which result from the horizontal sync signal $H_1$ and/or vertical sync signal $V_1$ and become mixed with a video signal $S_1$ as a crosstalk can be eliminated, allowing the valid range of the video signal to be accurately detected.

In the circuit 6 according to the first embodiment, the detection region window signal $D_1$ is produced on the basis of both the leading (or falling) edge and the trailing (or rising) edge of the horizontal and vertical sync signals $H_1$ and $V_1$. However, the present invention is not limited thereto, but alternatively, a length of time when the sync signal is active (i.e., a time length from the leading edge to the trailing edge) may be previously measured, and the detection region window signal $D_1$ may be produced so that it remains at its low level from the leading edge of the sync signal until the measured time length plus tp.

Second Embodiment

Figure 6:
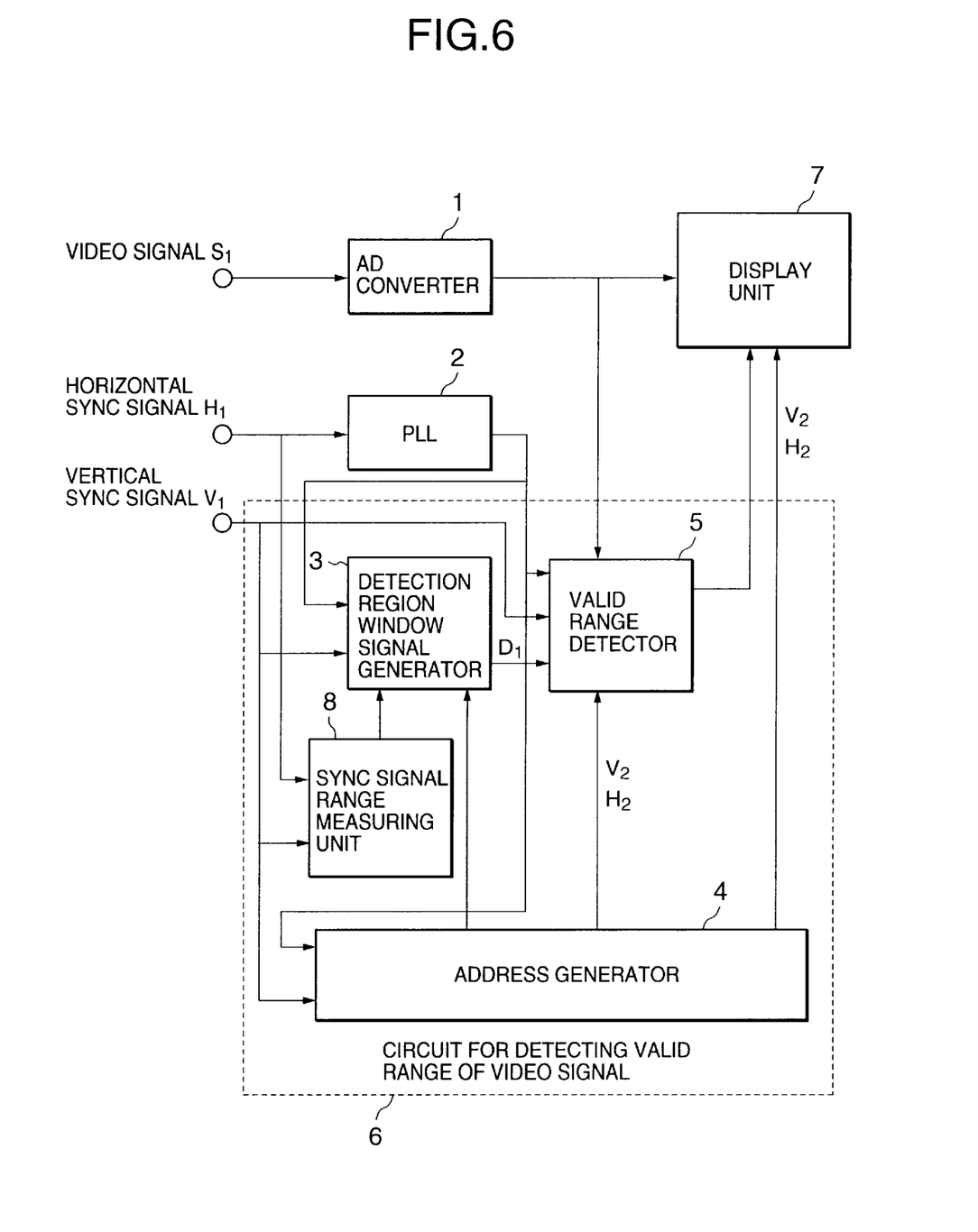
FIG. 6 is a block diagram showing a display apparatus incorporating a circuit for detecting a valid range of a video signal according to a second embodiment of the present invention.

FIG. 6 is a block diagram showing a display apparatus incorporating a circuit for detecting a valid range of a video signal according to a second embodiment of the present invention. In FIG. 6, a reference numeral 1 denotes an A/D converter, 2 denotes a PLL circuit, 3 denotes a detection region window signal generator, 4 denotes an address generator, 5 denotes a valid range detector, and 8 denotes a sync signal range measuring unit for measuring a time length, during which the horizontal sync signal $H_1$ and the vertical sync signal $V_1$ are active. The detection region window signal generator 3, the sync signal range measuring unit 8, the address generator 4 and the valid range detector 5 form in combination a circuit 6 for detecting a valid range of a video signal. In FIG. 6, a reference numeral 7 denotes a display unit including a display screen such as a liquid crystal panel, a PDP and the like.

Figure 7A:
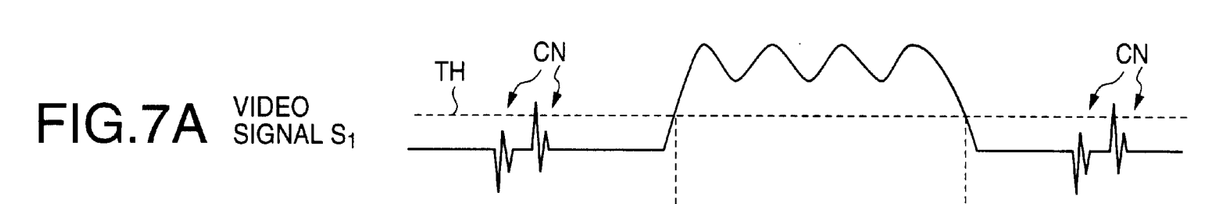
Figure 7B:
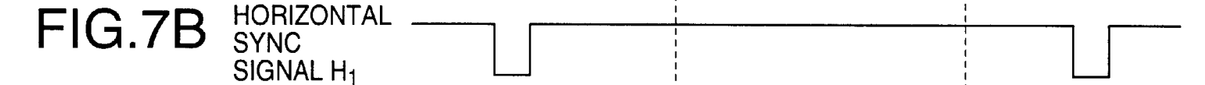
Figure 7C:
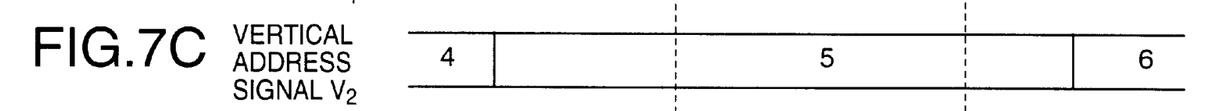
Figure 7D:
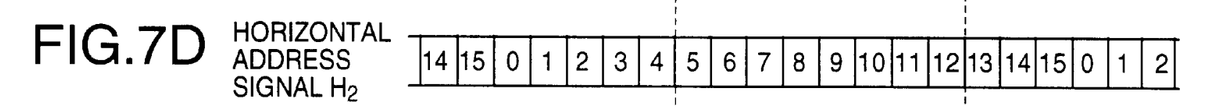
Figure 7E:
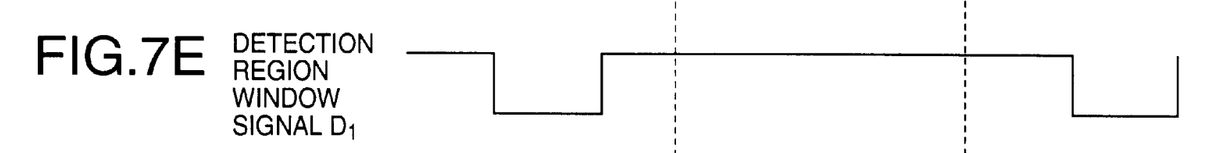
Figure 7F:
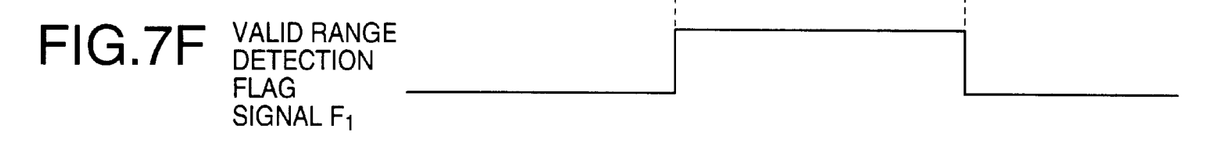

The operation of the display apparatus shown in FIG. 6 will be described below with reference to a series of timing charts shown in FIG. 7, which show the timings of various parts of the display apparatus incorporating the circuit 6 according to the second embodiment. FIG. 7A shows the video signal $S_1$ which is input, FIG. 7B shows the horizontal sync signal $H_1$, FIG. 7C shows the vertical address signal $V_2$ which is output from the address generator 4, FIG. 7D shows the horizontal address signal $H_2$, FIG. 7E shows the detection region window signal $D_1$, and FIG. 7F shows the valid range detection flag signal $F_1$ which is used in the internal processing by the valid range detector 5.

The sync signal range measuring unit 8 has a horizontal sync range measuring circuit and a vertical sync range measuring circuit, each of which measures a length of time from the leading edge to the trailing edge of the horizontal sync signal $H_1$ and a length of time from the leading edge to the trailing edge of the vertical sync signal $V_1$, respectively, and information representing the time during which the horizontal sync signal $H_1$ remains at its low level and the time during which the vertical sync signal $V_1$ remains at its low level is sent to the detection region window signal generator 3.

The detection region window signal generator 3 produces the detection region window signal $D_1$ (FIG. 7E) as the logical product of the signal which is caused to be at a low level in response to the falling edge of the horizontal reference signal (which coincides with the falling edge of the horizontal sync signal $H_1$) and which is caused to be at a high level with a time delay corresponding to the time, during which the horizontal sync signal $H_1$ remains at its low level, added with the time tp, and the signal which is caused to be at a low level in response to the falling edge of the vertical sync signal $V_1$ and which is caused to be at a high level with a time delay corresponding to the time, during which the vertical sync signal $V_1$ remains at its low level, added with the time tp.

Subsequently, the valid range detector 5 detects the valid range of the video signal $S_1$ using the detection region window signal $D_1$ to exclude the crosstalk noise CN, in the similar manner as in the first embodiment, and in response to a result of detection provided by the valid range detector 5, the display unit 7 displays the video signal during the valid range on the display screen at an appropriate position.

As discussed above, by using the circuit according to the second embodiment, an influence of noise components which may result from the horizontal sync signal $H_1$ and the vertical sync signal $V_1$ and which may be mixed with the video signal $S_1$ by a crosstalk can be eliminated, allowing the valid range of the video signal to be accurately detected.

In the above-described first and second embodiments, the detection of the valid range has been inhibited during a time from the falling edge of the sync signal to the rising edge thereof, but the present invention is not limited thereto. The detection may be inhibited only in the proximity of a change in the sync signal.

Third Embodiment

A block diagram of a display apparatus incorporating a circuit for detecting a valid range of a video signal according to a third embodiment is similar to that of the first embodiment, and therefor the third embodiment will be described with reference to FIG. 1. The circuit according to the third embodiment differs from that according to the first embodiment only in the operation of a detection region window signal generator 3.

Figure 8A:
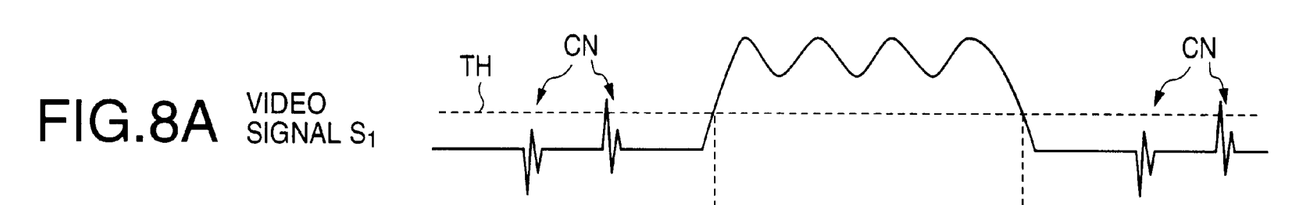
Figure 8B:
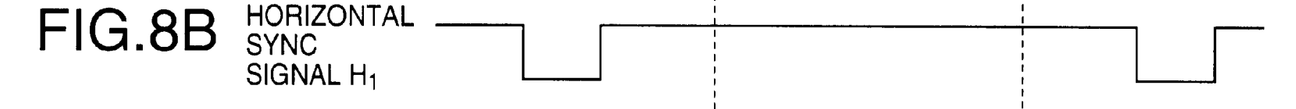
Figure 8C:
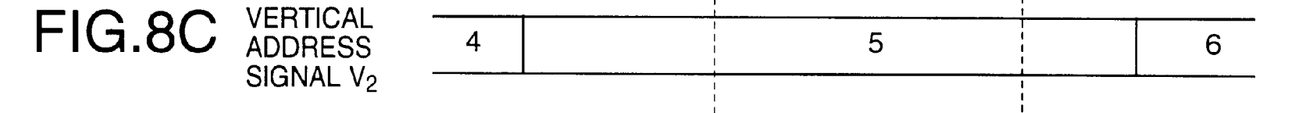
Figure 8D:
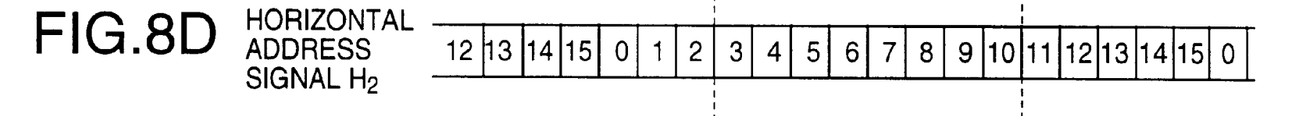
Figure 8E:
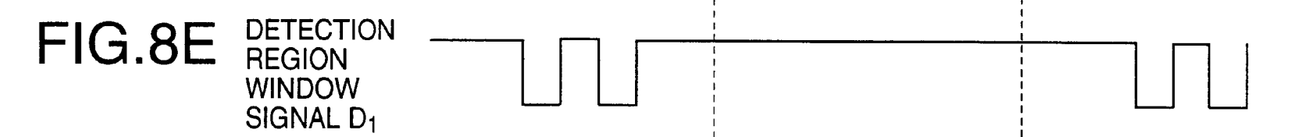
Figure 8F:
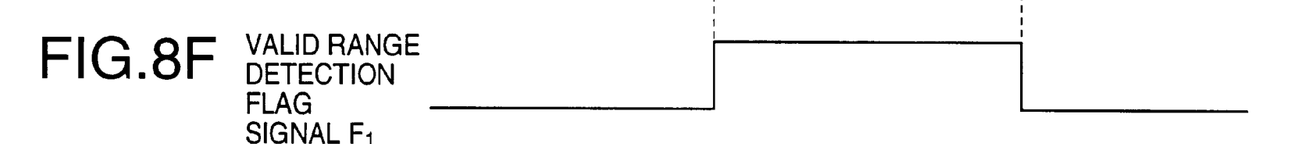

FIGS. 8A to 8F show a series of timing charts illustrating various parts of the display apparatus incorporating the circuit according to the third embodiment. FIG. 8A shows the video signal $S_1$ which is input, FIG. 8B the horizontal sync signal $H_1$ which is input, FIG. 8C the vertical address signal $V_2$ which is output from the address generator 4, FIG. 8D the horizontal address signal $H_2$, FIG. 8E the detection window signal $D_1$, and FIG. 8F the valid range detection flag signal $F_1$ which is used in the internal processing by the valid range detector 5. Except for the detection region window signal $D_1$ shown in FIG. 8E, other signals are similar to those shown in the first embodiment of FIG. 2.

The detection region window signal generator 3 generates the detection region window signal $D_1$ (FIG. 8E) which is caused to be at a low level in response to the falling edge of either the horizontal sync signal $H_1$ or the vertical sync signal $V_1$ and is caused to be at a high level with a time delay of tp from the falling edge and which again is caused to be at a low level in response to the rising edge of either the horizontal sync signal $H_1$ or the vertical sync signal $V_1$ and is caused to be at a high level with a time delay of tp from the rising edge.

The detection region window signal $D_1$ is used in the detection of the valid range by the valid range detector 5 in the similar manner as in the first embodiment. In the other respects, the operation is similar to the first embodiment until the video signal $S_1$ is displayed by the display unit 7.

As discussed above, when the circuit according to the third embodiment is used, an influence of the crosstalk noise CN can be eliminated if the detection of the valid range is inhibited only in the proximity of a change in the sync signal, allowing the valid range of the video signal to be accurately detected.

In the above-described first to third embodiments, the detection region is specified by the detection region window signal $D_1$ as a result of comparing the video signal $S_1$ against the threshold TH, but the present invention is not limited thereto. The video signal $S_1$ may be compared with the threshold TH after the video signal $S_1$ was gated by the detection region window signal $D_1$.

Fourth Embodiment

Figure 9:
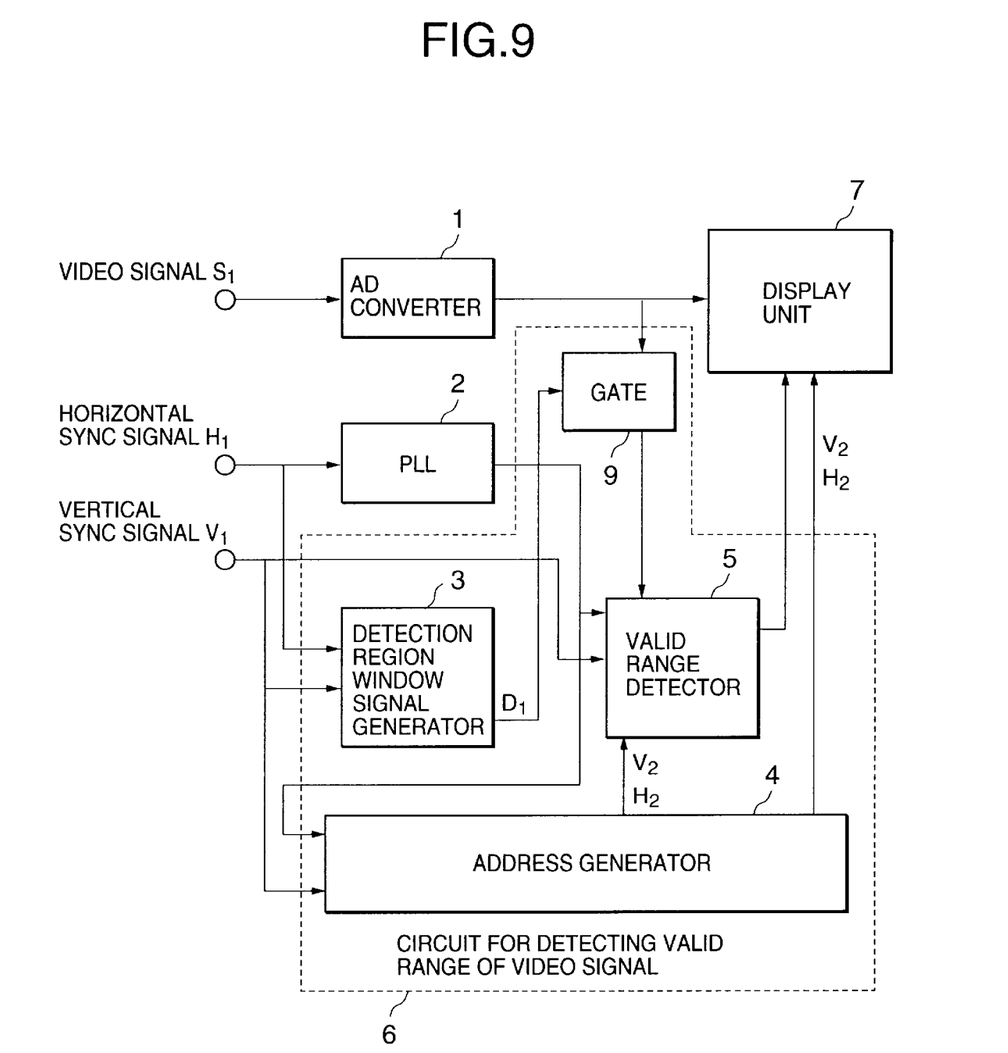
FIG. 9 is a block diagram showing a display apparatus incorporating a circuit for detecting a valid range of a video signal according to a fourth embodiment of the present invention.

FIG. 9 is a block diagram showing a display apparatus incorporating a circuit for detecting a valid range of a video signal according to a fourth embodiment of the present invention. In FIG. 9, a reference numeral 1 denotes an A/D converter, 2 denotes a PLL circuit, 3 denotes a detection region window signal generator, 4 denotes an address generator, 5 denotes a valid range detector, and 9 denotes a gate which uses the detection region window signal $D_1$ as a control signal to control the passage of the video signal through the gate. The detection region window signal generator 3, the address generator 4, the valid range detector 5 and the gate 9 form in combination the circuit 6 for detecting a valid range of a video signal. The display apparatus also includes a display unit 7.

Figure 10A:
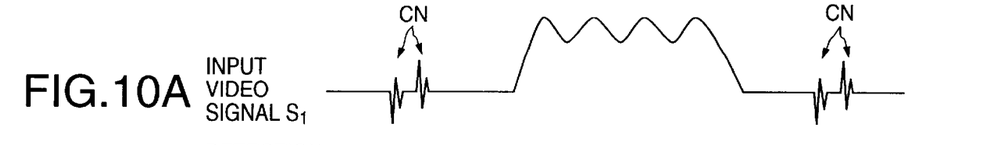
Figure 10B:
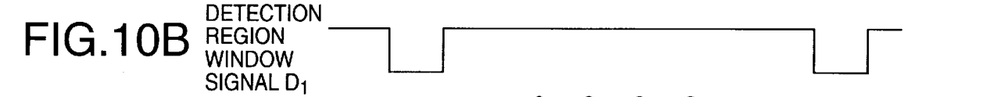
Figure 10C:
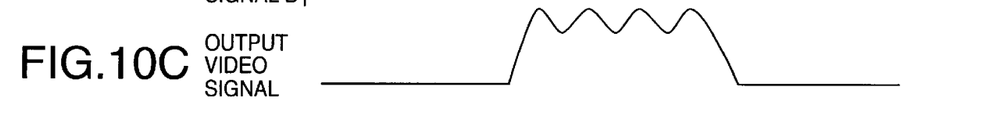

The operation of the display apparatus shown in FIG. 9 will be described below with reference to a series of timing charts shown in FIGS. 10A to 10C, which indicate input signals and an output signal for the gate circuit 9. Specifically, FIG. 10A shows the video signal $S_1$ which is input from the A/D converter 1, FIG. 10B the detection region window signal $D_1$ which is an input signal from the detection region window signal generator 3, and FIG. 10C an output signal from the gate circuit 9.

The detection region window signal generator 3 generates the detection region window signal $D_1$ in the similar manner as in the first embodiment. As shown in FIG. 10, the gate circuit 9 directly sends the video signal $S_1$ which is input when the detection region window signal $D_1$ is high, and sends "zero" when the signal $D_1$ is low. The term "zero" refers to the black level of the video signal. In this manner, noises which are superimposed upon the video signal as a result of the crosstalk from the horizontal sync signal $H_1$ an the vertical sync signal $V_1$ are eliminated.

An output signal from the gate circuit 9 is input to the valid range detector 5, which then compares the video signal which is passed through the gate circuit 9 against the predetermined threshold TH to produce the valid range detection flag signal $F_1$, which has a high level when the video signal is equal to or greater than the threshold TH and which has a low level otherwise. It also sends the left-end coordinate representing the minimum value and the right-end coordinate representing the maximum value in the horizontal address signal $H_2$ during the time the valid range detection flag signal $F_1$ is high to the display unit 7. It also sends the upper-end coordinate representing the minimum value and the lower-end coordinate representing the maximum value in the vertical address signal $V_2$ during the time the valid range detection flag signal $F_1$ is high, to the display unit 7.

Subsequently, the display unit 7 controls the video signal to be displayed on the display screen at an appropriate position thereon in accordance with the left-end, right-end, upper-end and lower-end coordinates which are input from the address generator 4, and the horizontal address signal $H_2$ and the vertical address signal $V_2$, in the similar manner as in the first embodiment.

As discussed above, by using the circuit according to the fourth embodiment, an influence of the crosstalk noise CN can be eliminated, allowing the valid range of the video signal to be accurately detected.

In the above-described first to fourth embodiments, a result of detection by the circuit has been used in controlling the position on the display screen, but the present invention is not limited thereto. The result of detection may be used as data that determines a number of samplings per line. For example, when an XGA signal having a valid range corresponding to 1024 picture elements in the horizontal direction and 768 lines in the vertical direction is input, the frequency division ratio of the PLL circuit may be determined to choose the number of samplings per line which is equal to 1024.

The circuit according to the present invention is not limited in its use to a matrix display unit such as a liquid crystal panel, a PDP, a DLP (digital light processing) display, an FED (field emission display), an EL (electroluminescence) display and the like, but can be adapted to any display unit which requires a control over the position on the display screen.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A circuit for detecting a valid range of a video signal on the basis of a vertical sync signal which has a first period and has a first level only during a first range of time and a second level otherwise, a horizontal sync signal which has a second period and has a third level only during a second range of time and a fourth level otherwise, said valid range being a range of time of said video signal which is to be displayed on a display screen;

said circuit comprising:
a detection window signal generator for generating a detection region window signal which has a fifth level during at least one of a first detection disable range of time of a predetermined length and a second detection disable range of time of a predetermined length, and has a sixth level otherwise, said first detection disable range of time containing a point of time when said vertical sync signal changes from said first level to said second level so that said first detection disable range of time ends at a point of time when a predetermined time has passed since said vertical sync signal returns from said first level to said second level, said second detection disable range of time containing a point of time when said horizontal sync signal changes, from said third level to said fourth level so that said second detection disable range of time ends at a point of time when a predetermined time has passed since said horizontal sync signal returns from said third level to said fourth level, the first detection disable range of time and the second disable range of time each representing signals being generated in the detection window signal generator; and
a valid range detector for detecting said valid range, during which said video signal has a level equal to or greater than a predetermined threshold and during which said detection region window signal has said sixth level.

2. The circuit of claim 1,
wherein said first detection disable range of time begins at a point of time when said vertical sync signal changes from said second level to said first level; and
wherein said second detection disable range of time begins at a point of time when said horizontal sync signal changes from said fourth level to said third level.

3. The circuit of claim 1, further comprising a measuring unit for measuring a first length of time during which said vertical sync signal has said first level and a second length of time during which said horizontal sync signal has said third level;
wherein said first detection disable range of time begins at a point of time when said vertical sync signal changes from said second level to said first level and ends at a point of time when a predetermined time added to said first length of time has passed; and
wherein said second detection disable range of time begins at a point of time when said horizontal sync signal changes from said fourth level to said third level, and ends at a point of time when a predetermined time added to said second length of time has passed.

4. The circuit of claim 1,
wherein said first detection disable range of time includes a range of time which begins at a first point of time when said vertical sync signal changes from said second level to said first level and ends at a point of time when a predetermined time has passed since said first point of time, and another range of time which begins at a second point of time when said vertical sync signal changes from said first level to said second level and ends at a point of time when a predetermined time has passed since said second point of time; and
wherein said second detection disable range of time includes a range of time which begins at a third point of time when said horizontal sync signal changes from said fourth level to said third level and ends at a point of time when a predetermined time has passed since said third point of time, and another range of time which begins at a fourth point of time when said horizontal sync signal changes from said third level to said fourth level and ends at a point of time when a predetermined time has passed since said fourth point of time.

5. A circuit for detecting a valid range of a video signal on the basis of a vertical sync signal which has a first period and has a first level only during a first range of time and a second level otherwise, a horizontal sync signal which has a second period and has a third level only during a second range of time and a fourth level otherwise, said valid range being a range of time of said video signal which is to be displayed on a display screen;
said circuit comprising:
a detection window signal generator for generating a detection region window signal which has a fifth level during at least one of a first detection disable range of time of a predetermined length and a second detection disable range of time of a predetermined length, and has a sixth level otherwise, said first detection disable range of time containing a point of time when said vertical sync signal changes from said first level to said second level so that said first detection disable range of time ends at a point of time when a predetermined time has passed since said vertical sync signal returns from said dirst level to said second level, said second detection disable range of time containing a point of time when said horizontal sync signal changes from said first level to said fourth level so that said second detection disable range of time ends at a point of time when a predetermined time has passed since said horizontal sync signal returns from said third level to said fourth level, the first detection disable range of time and the second disable range of time each representing signals being generated in the detection window signal generator;
a gate for allowing said video signal to pass therethrough when said detection region window signal has said sixth level and for outputting a zero-level signal as said video signal when said detection region window signal has said fifth level; and
a valid range detector for detecting said valid range, during which an output of said gate has a level equal to or greater than a predetermined threshold.

6. The circuit of claim 5,
wherein said first detection disable range of time begins at a point of time when said vertical sync signal changes from said second level to said first level; and
wherein said second detection disable range of time begins at a point of time when said horizontal sync signal changes from said fourth level to said third level.

7. The circuit of claim 5, further comprising a measuring unit for measuring a first length of time during which said vertical sync signal has said first level and a second length of time during which said horizontal sync signal has said third level;
wherein said first detection disable range of time begins at a point of time when said vertical sync signal changes from said second level to said first level, and ends at a point of time when a predetermined time added to said first length of time has passed; and
wherein said second detection disable range of time begins at a point of time when said horizontal sync signal changes from said fourth level to said third level, and ends at a point of time when a predetermined time added to said second length of time has passed.

8. The circuit of claim 5, wherein said first detection disable range of time includes a range of time which begins at a first point of time when said vertical sync signal changes from said second level to said first level and ends at a point of time when a predetermined time has passed since said first point of time, and another range of time which begins at a second point of time when said vertical sync signal changes from said first level to said second level and ends at a point of time when a predetermined time has passed since said second point of time; and wherein said second detection disable range of time includes a range of time which begins at a third point of time when said horizontal sync signal changes from said fourth level to said third level and ends at a point of time when a predetermined time has passed since said third point of time, and another range of time which begins at a fourth point of time when said horizontal sync signal changes from said third level to said fourth level and ends at a point of time when a predetermined time has passed since said fourth point of time.

9. A circuit for detecting a valid range of a video signal on the basis of a vertical sync signal which has a first period and has a first level only during a first range of time and a second level otherwise, a horizontal sync signal which has a second period and has a third level only during a second range of time and a fourth level otherwise, said valid range being a range of time of said video signal which is to be displayed on a display screen;

said circuit comprising:
- a detection window signal generator for generating a detection region window signal which has a fifth level during at least one of a first detection disable range of time of a predetermined length and a second detection disable range of time of a predetermined length, and has a sixth level otherwise, said first detection disable range of time changes state when said vertical sync signal changes its level, said second detection disable range of time changes state when said horizontal sync signal changes its level, the first detection disable range of time and the second disable range of time each representing signals being generated in the detection window signal generator;
- a valid range detector for detecting said valid range, during which said video signal has a level equal to or greater than a predetermined threshold and during which said detection region window signal has said sixth level; and
- a measuring unit for measuring a first length of time during which said vertical sync signal has said first level and a second length of time during which said horizontal sync signal has said third level, wherein said first detection disable range of time begins at a point of time when said vertical sync signal changes from said second level to said first level, and ends at a point of time when a predetermined time added to said first length of time has passed, and wherein said second detection disable range of time begins at a point of time when said horizontal sync signal changes from said fourth level to said third level, and ends at a point of time when a predetermined time added to said second length of time has passed.

10. A circuit for detecting a valid range of a video signal on the basis of a vertical sync signal which has a first period and has a first level only during a first range of time and a second level otherwise, a horizontal sync signal which has a second period and has a third level only during a second range of time and a fourth level otherwise, said valid range being a range of time of said video signal which is to be displayed on a display screen, said circuit comprising:
- a detection window signal generator for generating a detection region window signal which has a fifth level during at least one of a first detection disable range of time of a predetermined length and a second detection disable range of time of a predetermined length, and has a sixth level otherwise, said first detection disable range of time changes state when said vertical sync signal changes its level, said second detection disable range of time changes state when said horizontal sync signal changes its level, the first detection disable range of time and the second disable range of time each representing signals being generated in the detection window signal generator;
- a gate for allowing said video signal to pass therethrough when said detection region window signal has said sixth level and for outputting a zero-level signal as said video signal when said detection region window signal has said fifth level;
- a valid range detector for detecting said valid range, during which an output of said gate has a level equal to or greater than a predetermined threshold; and
- a measuring unit for measuring a first length of time during which said vertical sync signal has said first level and a second length of time during which said horizontal sync signal has said third level, wherein said first detection disable range of time begins at a point of time when said vertical sync signal changes from said second level to said first level, and ends at a point of time when a predetermined time added to said first length of time has passed, and wherein said second detection disable range of time begins at a point of time when said horizontal sync signal changes from said fourth level to said third level, and ends at a point of time when a predetermined time added to said second length of time has passed.

* * * * *